US008892817B2

(12) United States Patent
Bandic et al.

(10) Patent No.: US 8,892,817 B2
(45) Date of Patent: Nov. 18, 2014

(54) STORAGE DEVICE WITH INLINE ADDRESS INDIRECTION METADATA STORAGE

(75) Inventors: Zvonimir Z. Bandic, San Jose, CA (US); Yuval Cassuto, Lausanne (CH); Jonathan Darrel Coker, Rochester, MN (US); Cyril Guyot, San Jose, CA (US); Marco Sanvido, Belmont, CA (US)

(73) Assignee: HGST Netherlands B.V., Amsterdam (NL)

( * ) Notice: Subject to any disclaimer, the term of this patent is extended or adjusted under 35 U.S.C. 154(b) by 468 days.

(21) Appl. No.: 13/200,632

(22) Filed: Sep. 27, 2011

(65) Prior Publication Data

US 2012/0303866 A1   Nov. 29, 2012

Related U.S. Application Data

(60) Provisional application No. 61/489,174, filed on May 23, 2011.

(51) Int. Cl.
*G06F 12/16* (2006.01)
*G06F 12/08* (2006.01)
*G11B 5/012* (2006.01)

(52) U.S. Cl.
CPC ...................................... *G11B 5/012* (2013.01)
USPC .................... 711/112; 711/E12.103; 711/103

(58) Field of Classification Search
None
See application file for complete search history.

(56) References Cited

U.S. PATENT DOCUMENTS

| 6,185,063 B1 | 2/2001 | Cameron |
| 6,378,037 B1 | 4/2002 | Hall |
| 6,967,810 B2 | 11/2005 | Kasiraj et al. |
| 7,603,530 B1 | 10/2009 | Liikanen et al. |
| 8,019,925 B1 * | 9/2011 | Vogan et al. ...................... 711/4 |
| 2005/0071537 A1 * | 3/2005 | New et al. ...................... 711/100 |
| 2007/0183071 A1 | 8/2007 | Uemura et al. |
| 2010/0205623 A1 | 8/2010 | Molaro et al. |
| 2010/0232057 A1 | 9/2010 | Sanvido et al. |

OTHER PUBLICATIONS

Yuval Cassuto, et al.; Indirection Systems for Shingled-Recording Disk Drives; 26th IEEE (MSST 2010) Symposium on Massive Storage Systems and Technologies; 44 pages; published May 7, 2010. http://storageconference.org/2010/Presentations/Research/15.Cassuto.pdf.
Ahmed Amer, et al.; Design Issues for a Shingled Write Disk System; 26th IEEE (MSST 2010) Symposium on Massive Storage Systems and Technologies: Research Track; 12 pages; published May 7, 2010. http://storageconference.org/2010/Papers/MSST/Amer.pdf.
Ikuya Tagawa, et al.; Minimization of erase-band in shingled PMR with asymmetric writer; Journal of Magnetism and Magnetic Materials; No vol. or page given; online Dec. 2, 2010 in ScienceDirect.

* cited by examiner

*Primary Examiner* — Denise Tran
(74) *Attorney, Agent, or Firm* — G. Marlin Knight

(57) ABSTRACT

Methods are described that allow disk drives, such as shingle-written magnetic recording (SMR) drives, to recover an Indirection Address Table mapping of LBAs to PBAs after an emergency power off (EPO). Indirection Address Table (IAT) snapshots are periodically written inline with user data stores, and in one embodiment Cumulative Delta Lists (CDLs) with incremental address update information are stored between snapshots. In an embodiment of the invention, when an imminent loss of power is detected, the current CDL, covering IAT updates not yet written to disk, is saved to a nonvolatile memory. The IAT snapshots combined with the set of CDLs provide the information needed to recreate the current Indirection Address Table when power is restored after an emergency power loss. In an alternative embodiment the CDL is obviated by including metadata in the sector that encodes the address indirection mapping and the last snapshot ID.

20 Claims, 5 Drawing Sheets

STORAGE DEVICE WITH INLINE ADDRESS INDIRECTION METADATA STORAGE

This application is related to provision patent application filed on May 23, 2011 bearing Ser. No. 61/489,174, and the benefits of this provisional application are claimed under 35 U.S.C. 119(e).

FIELD OF THE INVENTION

The invention relates to the field of data storage device architecture using indirection for mapping physical storage locations to logical addresses and more particularly such indirection used in shingle-written magnetic recording (SMR) devices.

BACKGROUND

Conventional disk drives with magnetic media organize data in concentric tracks that are spaced apart. The concept of shingled writing is a form of perpendicular magnetic recording and has been proposed as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on a disk surface are organized into a plurality of shingled regions (also called I-region) which can be written sequentially from an inner diameter (ID) to an outer diameter (OD) or from OD to ID. The number of tracks shingled together in a region is a key performance parameter of shingled-writing. Once written in shingled structure, an individual track cannot be updated in place, because that would overwrite and destroy the overlapping tracks. Shingle-written data tracks, therefore, from the user's viewpoint are sometimes thought of like append-only logs. To improve the performance of SMR drives, a portion of the media is allocated to a so-called "exception region" (E-region) which is used as staging area for data which will ultimately be written to an I-region. The E-region is sometimes referred to as an E-cache.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or something closer to a physical address.

The conventional LBA-PBA mapping for defects does not need to be changed often. In contrast, in an SMR device the physical block address (PBA) of a logical block address (LBA) can change depending on write-history. For example, background processes such as garbage collection move data sectors from one PBA to another but the LBA stays the same. The indirection system for SMR is a natively dynamic system in which the controller translates host address requests to physical locations. In a SMR system, the LBA-PBA mapping changes with every write operation because the system dynamically determines the physical location on the media where the host data for an LBA will be written. The same LBA will be written to a different location the next time the host LBA is updated. The indirection system provides a dynamic translation layer between host LBAs and the current physical locations on the media.

The storage device's design must provide for the indirection address mapping scheme to be recoverable after emergency power off, so the mapping of logical block addresses (LBA) to physical locations must be recorded in persistent media. Prior art file systems maintain a separate area on the disks for metadata storage used to track LBA locations. However, such a solution exhibits poor performance for a disk drive, since it requires additional seeks to and from metadata area.

Prior art methods of handling disk drive RAM caches had to provide solutions to power loss problems. In U.S. Pat. No. 6,378,037 to Hall (Apr. 23, 2002) fail-safe write caching used specially arranged portions of a disk surface to store write cache data during drive idle time. In case of a system or power failure before the data is written to its ultimate disk destination, the data can be read from the specially arranged portions to effect recovery without data loss.

SUMMARY OF THE INVENTION

Embodiments of the invention allow disk drives, such as shingle-written magnetic recording (SMR) drives, to recover an Indirection Address Table mapping of LBAs to PBAs after an emergency power off (EPO) without frequent backing-up of full Indirection Address Table at a reserved location on the disk. An embodiment of the invention periodically stores Indirection Address Table (IAT) snapshots and then stores incremental address metadata update information between snapshots, which will be called the Cumulative Delta List, along the same track (or a nearby track) with the actual sector being written with user data. This eliminates the problem of requiring additional seeks to and from a reserved metadata area on the disk to save the IAT. The invention can be used with the ring buffer techniques used for temporary storage or staging of user data in E-region. The IAT Snapshots and the Cumulative Delta List are periodically written to the media based on I/O operations, for example, after a predetermined number of writes. The Cumulative Delta List (CDL) can be written multiple times between IAT Snapshots and each CDL is linked to the last snapshot by a unique identifier. Each CDL includes only the address Deltas since the last time the CDL was saved.

In an embodiment of the invention, when an imminent loss of power is detected, the current Cumulative Delta List, covering IAT updates not yet written to disk, is saved to a predetermined nonvolatile memory such as a flash memory. The IAT snapshots combined with the set of Cumulative Delta Lists provide the information needed to recreate the current Indirection Address Table when power is restored after an emergency power loss. The power-up routine of the drive after emergency power loss updates the Indirection Address Table by finding the last IAT Snapshot written to the media and then updating it using the corresponding set of Cumulative Delta Lists written on the disk and the last one written to the flash memory.

In one embodiment, the Cumulative Delta List is written into a standard user-data block (e.g. a sector) area using the entire data-block. The sectors containing the Cumulative Delta List are interspersed with the user data sectors. Note that the sectors used by the device for its metadata will not have LBAs assigned in the IAT and, therefore, will not be visible to the host in normal operation.

In an alternative embodiment the Cumulative Delta List is obviated by including metadata in the sector of the device that encodes the address indirection mapping and the last snapshot ID.

DETAILED DESCRIPTION OF THE INVENTION

Figure 1:
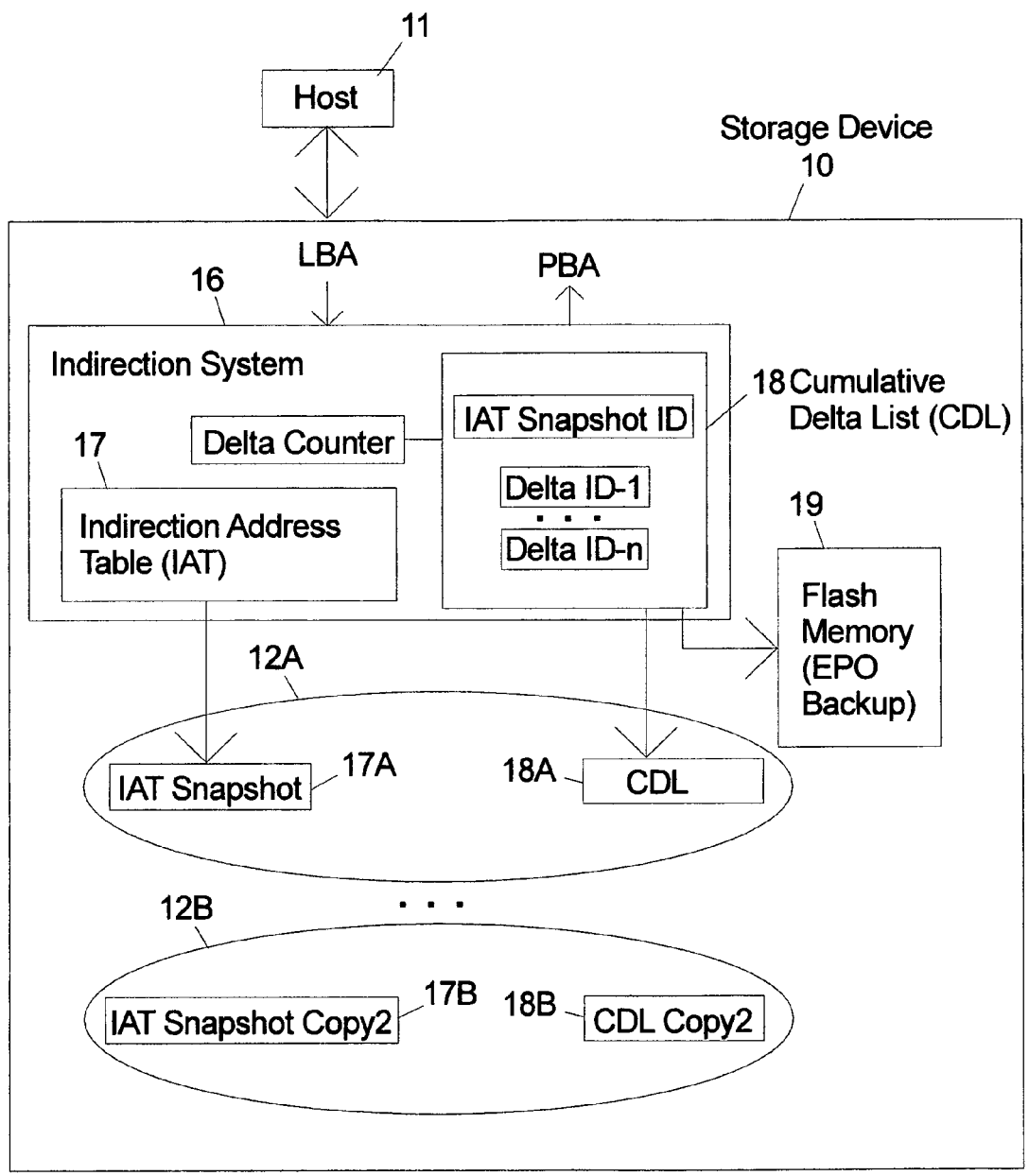
FIG. 1 is an illustration of a data storage device with an Indirection System according to an embodiment of the invention.

FIG. 1 is an illustration of a data storage device (DSD) 10 using SMR with an Indirection System 16 with a single Indirection Address Table (IAT) 17 according to an embodiment of the invention. The host 11 sends read and write commands that reference standard logical block addresses (LBAs). In a typical SMR drive architecture an LBA can be assigned to an E-region or to an I-region, which complicates the task indirection mapping. Various approaches to the problem of maintaining indirection tables are to be expected in practical applications. For example, one approach is to keep two indirection tables: one table that maps LBAs to the E-region or to an I-region and a second table that maps the LBA to I-track within the I-region. The embodiments of the invention described herein allow the writing of indirection table information inline with user data within a variety of approaches of indirection table management including the use of multiple tables. In the embodiments described, however, only one indirection table is referenced. Additional tables can be handled in a similar manner or can be stored using an entirely different approach. If, for example, one of the tables is updated much more frequently because it covers the E-region, it might be handled according to the invention, while a second table that is not updated as frequently might be handled using a method requiring more overhead.

The Indirection System 16 translates the LBAs into physical block addresses (PBAs) for internal use by the device. The Indirection System 16 can, for example, be implemented as a functional component in the controller portion of the DSD 10. The Indirection System 16 functions according to the prior art except as described herein, and aspects of the Indirection System that perform prior art functions are not shown. While the device is operating normally, the current PBA corresponding to an LBA is found in the Indirection Address Table (IAT) 17 in RAM. As noted above the IAT changes with every write operation in an SMR drive. Because the IAT in RAM is subject to loss when power is lost. However, the content of the Indirection Address Table (IAT) must be recoverable from persistent media after emergency power off or otherwise data is permanently lost. Frequent backing-up of full Indirection Address Table at a reserved location on the disk is not a realistic solution because the additional I/Os would result in poor performance. In SMR writes, including metadata writes, should be sequentialized for optimum performance. The invention allows IAT metadata to be written on-track along with the user data in an E-region where the user data is temporarily stored before being written to an I-region. Each disk surface in an SMR will typically have at least one band of tracks dedicated to serving as the E-region. The bulk of the tracks will be organized into I-regions.

An embodiment of the invention stores Indirection Address Table (IAT) Snapshots 17A, 17B along the same track (or a nearby track) with the actual sector being written with user data in an E-region, and therefore, allows efficient integration with the normal E-region use. The multiple concentric tracks on the disks 12A, 12B are not shown and are according to the prior art except as noted herein. Indirection Address Table (IAT) Snapshots are copies of the current IAT at that time. A unique IAT Snapshot ID (not shown) is included in each snapshot so that the latest one can identified during a recovery process. The IAT Snapshot ID can be a counter that has a large enough range to avoid ambiguity between old and new snapshots. The range should cover the number of snapshots performed in the time of writing a full shingled I-region on the disk.

Although only a single snapshot copy of the IAT is required, making two or more copies on different disks 12A, 12B as shown, has the advantage of providing redundancy in case one of the copies is not recoverable for whatever reason including loss of a head or an entire disk surface. Storing multiple copies of the indirection structures can allow the device to operate properly with the remaining undamaged data. The extra copies can be written efficiently in the E-regions on additional disks by switching heads even in the typical case of a device that does not have multiple channels that would allow writing to two disks at the same time.

As noted above the next write operation executed by the device will not be reflected in last snapshot. Thus, the snapshot on the media falls behind the current IAT as each additional write operation is performed. Rather than rewrite the entire IAT, which can be quite large, for each write operation, the invention creates and periodically writes incremental metadata update information between snapshots. The incremental update information is called the Cumulative Delta List (CDL) 18, which is kept in RAM. There can there be multiple CDL writes to the media between IAT Snapshots. The maximum size of the CDL determines how often is written. Each CDL write is linked to the last IAT Snapshot by including an IAT Snapshot ID. Each CDL write includes the address deltas since the last CDL write or since the IAT Snapshot if it is the first CDL after a Snapshot.

The frequency with which IAT Snapshots are written to the media is a design choice when implementing the invention. Snapshot frequency implies tradeoffs in EPO recovery time and the amount of storage allocated for CDL storage in the interspersed embodiment. In one embodiment, a snapshot write is triggered after a selected number of write operations. Similarly the number of deltas in a CDL is a design choice with tradeoffs. Writes are not committed until the CDL deltas is written, so a bigger CDL implies a higher maximum number of uncommitted writes that can exist.

Although the invention is compatible with a ring buffer embodiment of E-region architecture, the invention does not require that a ring buffer be used. Because the invention allows the IAT Snapshots and CDLs to be written inline with user data, it can be used with other E-region architectures.

Figure 2:
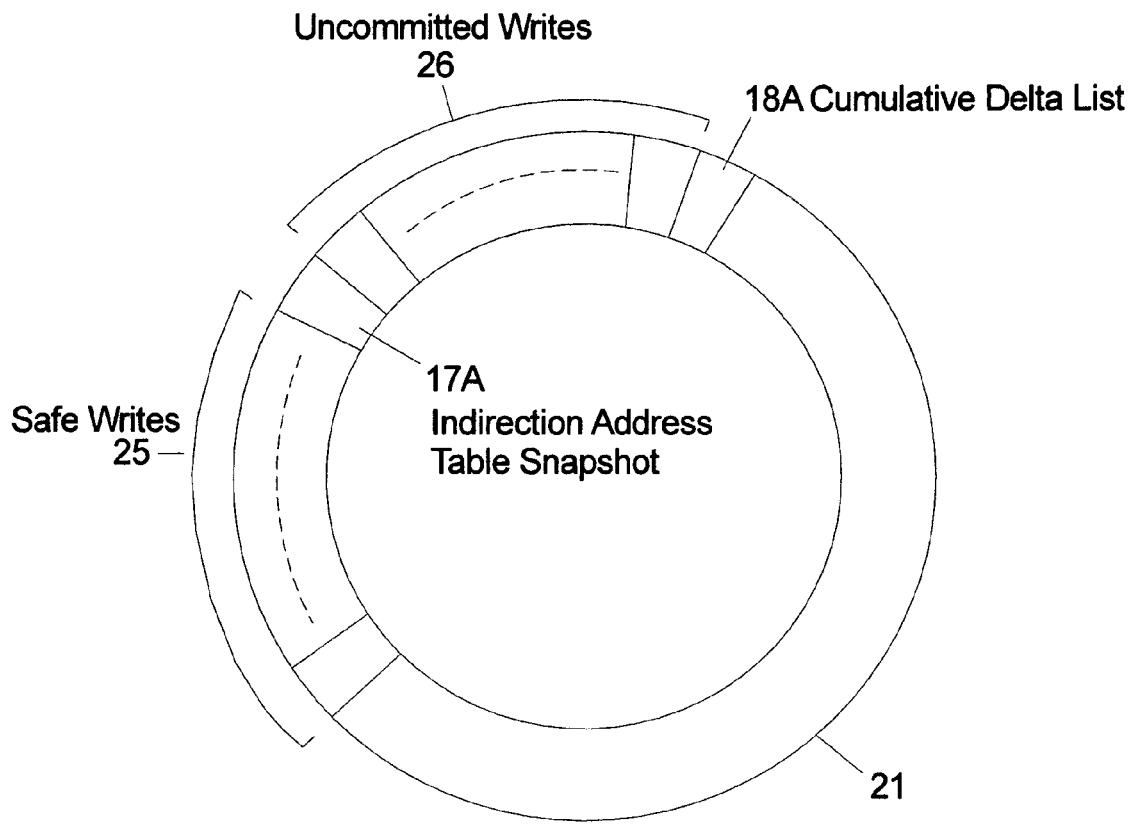
FIG. 2 illustrates a ring buffer on the media as used according to an embodiment of the invention.

FIG. 2 illustrates a ring buffer 21 on the media in an E-region as used according to an embodiment of the invention. The management of the head and tail pointers of the ring buffer is according to the prior art. The "safe writes" 25 are a series of user data sectors that were written to the media track. After the safe writes, the IAT Snapshot 17A was written. It is the writing of the snapshot that makes the previous writes "safe" by recording the IAT Snapshot that includes the PBA-LBA mapping for these writes. The "uncommitted writes" 26 are user data writes that were made after the IAT Snapshot. The CDL 18 that is kept in RAM is updated when each write occurs. The CDL 18A in the ring buffer was written after the series of "uncommitted writes" 26 and contains Delta ID entries for each of the uncommitted writes. In this embodiment the CDL is written when the number Delta IDs reach a predetermined number that, for example, fills the allotted RAM space (buffer). If the IAT Snapshots are written on multiple disks as discussed above, then the CDLs 18A, 18B should also be written on multiple disks.

Figure 3:
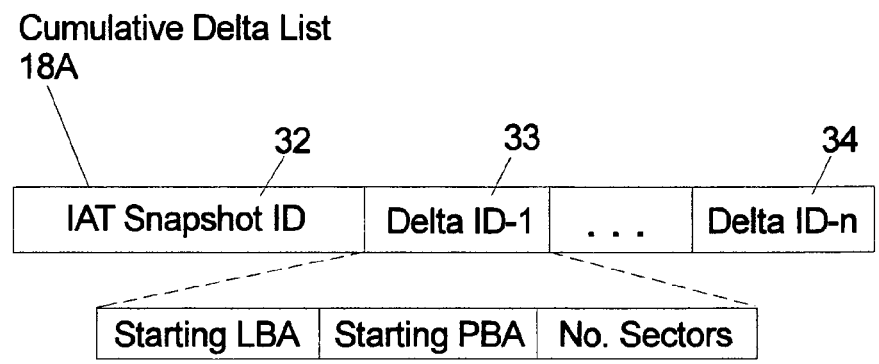
FIG. 3 illustrates the contents of a Cumulative Delta List according to an embodiment of the invention.

FIG. 3 illustrates the contents of a Cumulative Delta List (CDL) 18A as written to the media according to an embodiment of the invention. When the IAT snapshot is saved on the media, the Delta ID portion 33, 34 of the CDL is reset to empty and the IAT Snapshot ID 32 for the saved snapshot is recorded. The CDL is inherently tied to the latest IAT Snapshot by the ID. The ring buffer can be large enough that multiple snapshots and CDLs can exist on the media since the previous snapshots are not automatically erased. Therefore, the post EPO recovery process must have a way to tell the latest snapshot and associated CDLs from earlier ones. The IAT Snapshot ID which is recorded in both IAT snapshot and the CDLs serves this purpose. The IAT Snapshot ID sequence must be unambiguous so that the recovery routine after EPO can tell which ID is the most recent. One way to implement the ID is to make it a monotonously increasing counter, then during the power-on recovery routine, the firmware can stop reading the Snapshot and CDL data whenever the ID decreases, which is the signal that the most recent data in the ring buffer has been reached.

Each Delta ID in the list 33, 34 includes the three pieces of information needed to update the IAT for the particular write command being recorded, which are the Starting LBA, Starting PBA and the number of sectors. Each Delta ID can be 6 bytes, for example. The maximum size of the CDL with multiple Delta IDs can be limited so that it can be contained in one sector. The starting LBA/PBA fields may not have to be the full LBA/PBA address since indirection can be limited (e.g. drive is partitioned to independent sections and only offsets within sections are needed).

Figure 4:
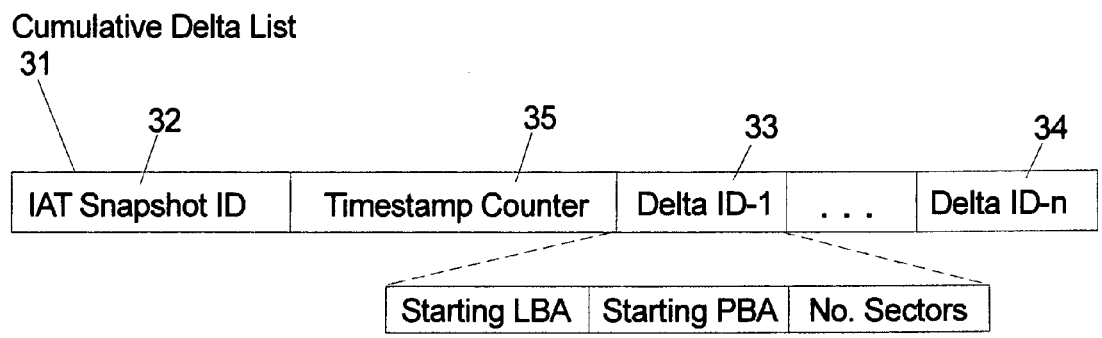
FIG. 4 illustrates the contents of a Cumulative Delta List that includes a timestamp according to an alternative embodiment of the invention.

In some embodiments of an indirection mapping, a timestamp is needed to determine which Delta ID is the most recent. Thus, in the embodiment of the CDL shown in FIG. 4 an additional field is included, the Timestamp Counter 35. In some embodiment of the invention the Delta IDs of a given LBA are constrained to only reside in the current shingled region so that the valid location of the LBA appears in the last Delta ID after the snapshot point. However, in some embodiments this constraint is not imposed, and a timestamp is needed to determine which Delta ID is the most recent. This timestamp might be needed, for example, when there are two indirection tables including one that maps LBAs to the E-region or to I-tracks; and the one that maps the I-track to a location within the I-region. For the first one, Deltas could be stored in either location, whereas Deltas for the second one could potentially be stored in the I-track region.

Figure 6:
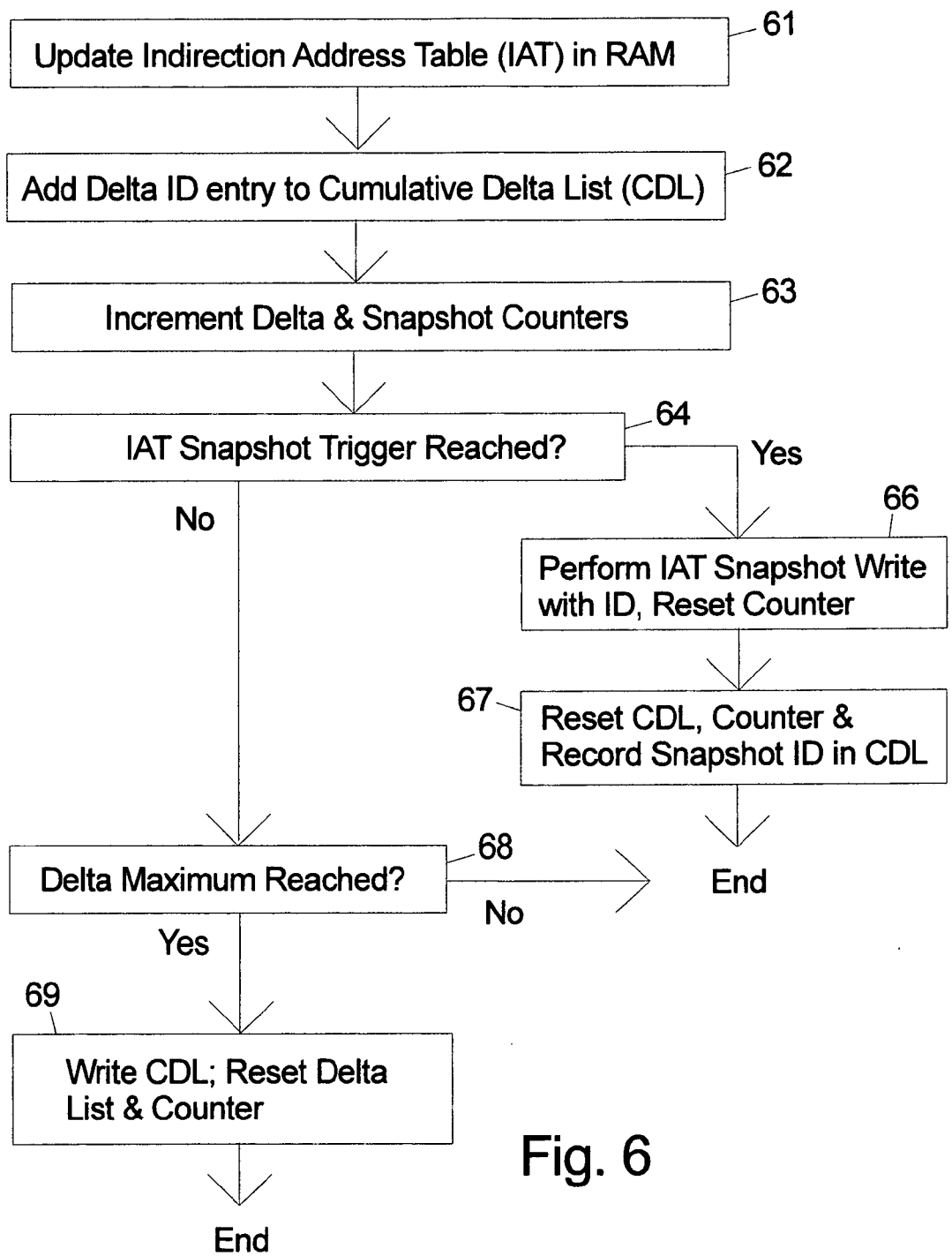
FIG. 6 illustrates a method of writing IAT Snapshots and CDLs according to an embodiment of the invention.

An exemplary sequence for a typical write operation for a write command received by the device from a host according to an embodiment of the invention is described below with reference to FIG. 6 which illustrates a method of writing IAT Snapshots and CDLs according to an embodiment of the invention. The LBA(s) are defined by the host and included in commands sent to the device. The PBA(s) are determined by the device. The IAT in RAM is updated for the LBA(s) and PBA(s) associated with the write operation 61. A Delta ID entry is added to the Cumulative Delta List in RAM for this write operation 62. Data supplied by the host for the write command is written to the PBA(s) on the media, but is "uncommitted." The Delta and Snapshot Counters are incremented 63. If the IAT Snapshot Counter trigger point has been reached 64, then the IAT Snapshot (which will include the Deltas) is written with the Snapshot ID and the Snapshot Counter is reset 66. The Cumulative Delta List in RAM is now obsolete, so it is reset to contain the just the Snapshot ID and no Deltas 67.

If an IAT Snapshot is not triggered, then the Delta Counter is checked for the selected maximum 68 and if reached then the Cumulative Delta List (CDL) is written to the media, the Delta IDs are set to empty and the Delta Counter is set to zero 69. Note that the IAT Snapshot ID for the CDL is not changed when the CDL is written to media. There can be multiple CDL writes between IAT Snapshots and each of these CDLs contains the same IAT Snapshot ID.

In an embodiment of the invention, when an imminent loss of power is detected by the device, the CDL in RAM, which covers any updates since the last metadata write (which can be an IAT Snapshot or the last CDL write), is saved to a predetermined nonvolatile memory such as a Flash memory 19 in FIG. 1. Each CDL is inherently smaller than the IAT and can be kept down in size by more frequent writing to disk. The size of the Flash memory needed for EPO storage is relatively small since it only needs to hold the latest CDL. It follows that the time needed to write the CDL under imminent EPO conditions is also small. In contrast the size of the IAT is a function of the total number of I-Tracks and the size of the E-Region, rather than being a simple number of bytes per sector, for example. Practical SMR devices can be expected to have IATs that are at least on the order of tens of megabytes.

Figure 7:
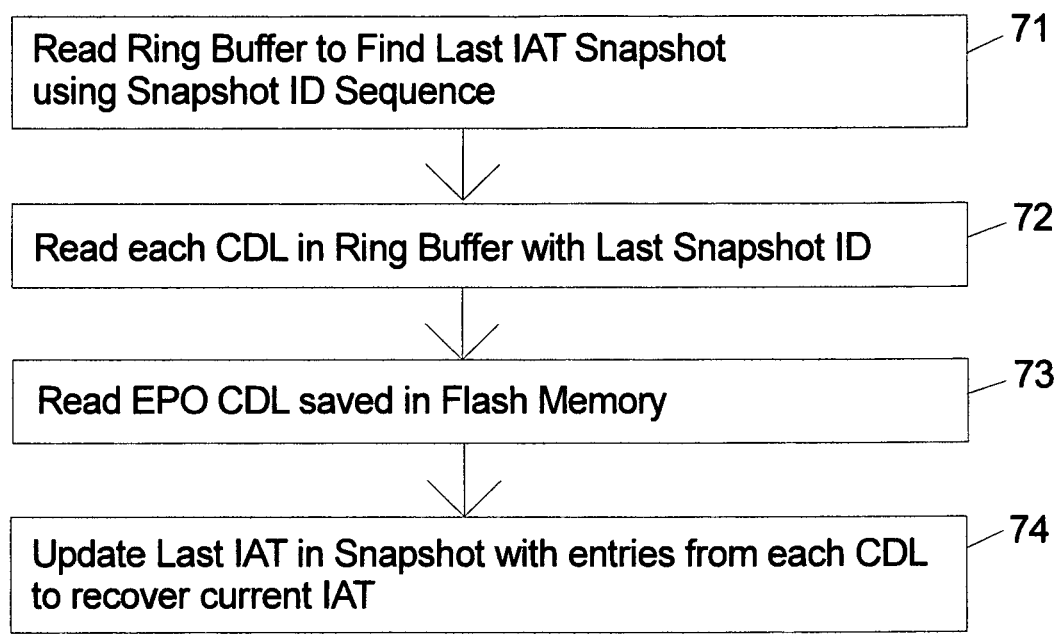
FIG. 7 illustrates a method of using the IAT Snapshots and CDLs to rebuild an IAT after an emergency power-off according to an embodiment of the invention.

FIG. 7 illustrates a method of using the IAT Snapshots and CDLs to rebuild an IAT after an emergency power-off according to an embodiment of the invention. The last IAT Snapshot combined with the set of possibly multiple Cumulative Delta Lists provide the information needed to recreate the current Indirection Address Table when power is restored after an emergency power loss. The power-up routine can read the entire ring buffer if necessary to find the last IAT Snapshot 71 and the subsequent CDLs 72, if any exist. The IAT Snapshot ID is used to identify the last snapshot from older snapshots that might still exist in the ring buffer. If the power-up routine reads an IAT Snapshot with an ID that is older than the previous one that was read from the buffer, then the routine knows that the last IAT Snapshot has been found. The corresponding set of CDLs will contain the IAT Snapshot ID and will follow the latest IAT Snapshot in the ring buffer. In addition the power-up routine must read the final EPO CDL that was written to Flash memory as described above 73. Once the power-up routine has the last IAT Snapshot, then the IAT is updated using the Delta IDs in each of CDLs to obtain the current IAT 74. Of course, it is possible for an EPO to occur immediately after a Snapshot or CDL write before any new Delta ID entries have been made. In this case the EPO CDL will not contain any Delta IDs. It is also possible that an EPO could occur before any CDLs have been written to disk. If there are no CDLs either on the disk or in the Flash, then the IAT Snapshot represents the current IAT without any updates being needed.

In one alternative embodiment of the invention the metadata that maps the LBA and PBA is included as part of the sector format, and this eliminates having to keep and write the CDLs. The IAT Snapshots are still created as described above. One advantage of this embodiment is that there is no need to write sectors with the CDLs, because the sector metadata serves the role of the Delta IDs. Each of the sectors that are written following the snapshot inherently contains the LBA metadata needed to update the IAT in the preceding snapshot to include the subsequently written sectors. For this embodiment the power-up routine after an EPO finds the last IAT Snapshot as described above, but there are no CDLs to find. In place of the CDLs the routine reads the metadata in each PBA (sector) containing the snapshot ID that for the last snapshot in the ring buffer. The LBA corresponding to the PBA in the metadata is then used to update IAT in the last snapshot to the current state.

Figure 5A:
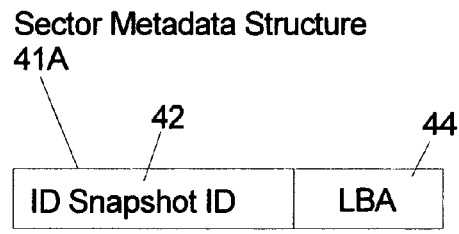
FIG. 5A illustrates the contents of a sector metadata structure according to an alternative embodiment of the invention.
Figure 5B:
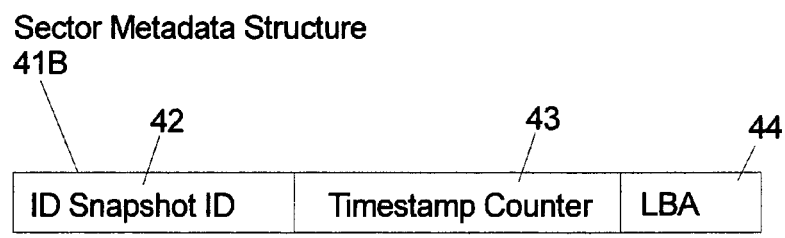
FIG. 5B illustrates the contents of a sector metadata structure that includes a timestamp according to an alternative embodiment of the invention.

The sector metadata 41A for an embodiment of the invention is illustrated in FIG. 5A. The extra metadata lengthens the physical size of a sector by a few bytes, e.g. 4 bytes. The metadata 41A stored explicitly in this embodiment includes the last IAT Snapshot ID 42, and LBA 44. The IAT Snapshot ID is required to distinguish between committed and uncommitted writes. An alternative embodiment of the sector metadata 41B for an embodiment of the invention is illustrated in FIG. 5B. Sector metadata 41B includes a Timestamp Counter 43, which serves the same function as the timestamp counter in the CDL alternative discussed above. Timestamp Counter 43 is required if IAT updates on the same LBA can appear in another shingled region, e.g. I-Track region as discussed above. The PBA is implicitly known by the device for each sector on the media since the PBA is the actual physical address. There is also no need to define the number of sectors, which is inherently one.

The LBA metadata can be stored explicitly in addition to any other metadata that is included in the sector architecture. Prior art sector formats include metadata in the form of ECC bytes that typically follow the user data in the physical sector on the media. The LBA metadata can also be encoded into the ECC bytes, for example, by being used as a seed to the ECC encoding. The tradeoffs are that storing LBA metadata stored explicitly costs a few extra bytes in format efficiency, while using it as an ECC seed costs in reliability by diminishing the ECC capability.

The invention claimed is:

1. A method of operating a data storage device having an Indirection Address Table mapping logical block addresses (LBAs) to physical block addresses (PBAs), the method comprising:
    periodically writing a snapshot of the Indirection Address Table on a disk inline with user data being written in a buffer on the disk, with the snapshot being written after a first block of user data has been written in the buffer and before a second block of user data so that the snapshot is positioned between first and second blocks of user data, each snapshot including a snapshot ID that identifies a last snapshot from earlier snapshots; and
    after each snapshot is written, making a Delta List that contains a set of entries that record subsequent changes to the Indirection Address Table after the first block of user data has been written, with entries mapping at least one LBA to a PBA for the second block of user data and periodically writing the Delta List to the buffer on the disk, each Delta List including the snapshot ID that identifies the last snapshot.

2. The method of claim 1 further comprising actions taken after power is restored subsequent to emergency power-off of:
    reading the buffer to find the last snapshot of the Indirection Address Table and the last snapshot ID;
    reading each Delta List in the buffer that includes the last snapshot ID; and
    updating the Indirection Address Table in the last snapshot using the set of entries that record changes to the Indirection Address Table recorded in the Delta Lists.

3. The method of claim 1 further comprising saving the Delta List to a predetermined nonvolatile memory when an imminent emergency power-off is detected.

4. The method of claim 1 wherein the data storage device is a shingled magnetic recording (SMR) device and the buffer is a ring buffer in an E-region on the disk.

5. The method of claim 1 wherein each entry in the Delta List includes a timestamp.

6. A method of operating a data storage device having an Indirection Address Table mapping logical block addresses (LBAs) to physical block addresses (PBAs), the method comprising:
    periodically writing a snapshot of the Indirection Address Table on a disk inline with user data being written in a buffer on the disk, each snapshot including a snapshot ID that identifies a last snapshot from earlier snapshots; and
    after each snapshot is written, making a Delta List that contains subsequent changes to the Indirection Address Table and periodically writing the Delta List to the buffer on the disk, each Delta List including the snapshot ID that identifies the last snapshot; and
    the method further comprising saving the Delta List to a predetermined nonvolatile memory when an imminent emergency power-off is detected; and the method further comprising actions taken after power is restored subsequent to emergency power-off of:
    reading the buffer to find the last snapshot of the Indirection Address Table and the last snapshot ID;
    reading each Delta List in the buffer that includes the last snapshot ID;
    reading the Delta List in the predetermined nonvolatile memory; and
    updating the Indirection Address Table in the last snapshot using the changes to the Indirection Address Table recorded in the Delta Lists.

7. The method of claim 1 wherein periodically writing the Delta List to the buffer on the disk further comprises writing the Delta List in a user-data block area using all of the data-block.

8. A method of operating a data storage device having an Indirection Address Table mapping logical block addresses (LBAs) to physical block addresses (PBAs), the method comprising:
    periodically writing a snapshot of the Indirection Address Table on a disk inline with user data being written in a buffer on the disk, each snapshot including a snapshot ID that identifies a last snapshot from earlier snapshots; and
    after each snapshot is written, making a Delta List that contains subsequent changes to the Indirection Address Table and periodically writing the Delta List to the buffer on the disk, each Delta List including the snapshot ID that identifies the last snapshot; and wherein periodically writing the snapshot of the Indirection Address Table further comprises using a count of write operations as a trigger for writing the snapshot.

9. A method of operating a data storage device having an Indirection Address Table mapping logical block addresses (LBAs) to physical block addresses (PBAs), the method comprising:
periodically writing a snapshot of the Indirection Address Table on a disk inline with user data being written in a buffer on the disk with the snapshot being written after a first block of user data has been written and before a second block of user data so that the snapshot is positioned between first and second blocks of user data, each snapshot including a snapshot ID that identifies a last snapshot from earlier snapshots; and
writing metadata in each PBA in the second block of user data subsequently written in the buffer that identifies the LBA corresponding to the PBA and contains the snapshot ID that for the last snapshot.

10. The method of claim 9 further comprising actions taken after power is restored subsequent to emergency power-off of:
reading the buffer to find the last snapshot of the Indirection Address Table and the last snapshot ID;
reading the set of PBAs with corresponding LBAs in the buffer that include the last snapshot ID; and
updating the Indirection Address Table in the last snapshot to map the corresponding LBAs to the PBAs in the set of PBAs.

11. The method of claim 9 wherein the data storage device is a shingled magnetic recording (SMR) device and the buffer is a ring buffer in an E-region on the disk.

12. A method of operating a data storage device having an Indirection Address Table mapping logical block addresses (LBAs) to physical block addresses (PBAs), the method comprising:
periodically writing a snapshot of the Indirection Address Table on a disk inline with user data being written in a buffer on the disk, each snapshot including a snapshot ID that identifies a last snapshot from earlier snapshots; and
writing metadata in each PBA subsequently written in the buffer that identifies the LBA corresponding to the PBA and contains the snapshot ID that for the last snapshot; and
wherein periodically writing the snapshot of the Indirection Address Table further comprises using a count of write operations as a trigger for writing the snapshot.

13. A data storage device using shingled magnetic recording comprising:
an Indirection Address Table that maps logical block addresses (LBAs) into physical block addresses (PBAs);
a buffer in magnetic media on a disk surface containing user data and at least one snapshot of the Indirection Address Table inline with the user data, the snapshot including a snapshot ID; and
an indirection system that periodically writes snapshots of the Indirection Address Table with a snapshot ID to the buffer inline with blocks of user data with the snapshot following a first block of user data written in the buffer and including Indirection Address Table entries for the first block of user data and being positioned before a second block of user data so that the snapshot is positioned between first and second blocks of user data, the snapshot ID identifying a last snapshot from earlier snapshots.

14. The data storage device of claim 13 wherein the indirection system makes a Delta List that contains subsequent changes to the Indirection Address Table after the snapshot is written, with entries in the Delta List mapping at least one LBA to a PBA for the second block of user data, and periodically writes the Delta List to the buffer on the disk, each Delta List including the snapshot ID that identifies the last snapshot.

15. The data storage device of claim 14 further comprising a Flash memory for storing the Delta List when an imminent emergency power-off is detected.

16. The data storage device of claim 15 wherein the indirection system rebuilds the Indirection Address Table after an emergency power-off by reading the buffer to find the last snapshot of the Indirection Address Table and the last snapshot ID; reading each Delta List in the buffer that includes the last snapshot ID; reading the Delta List in the Flash memory and updating the Indirection Address Table in the last snapshot using the changes to the Indirection Address Table recorded in the Delta Lists.

17. The data storage device of claim 14 wherein each entry in the Delta List includes a timestamp.

18. The data storage device of claim 14 wherein the Delta List is written in a user-data block area using all of the data-block.

19. The data storage device of claim 13 wherein each PBA in the buffer includes metadata that identifies the LBA corresponding to the PBA and contains the snapshot ID that for the last snapshot.

20. The data storage device of claim 13 wherein the buffer is a ring buffer in an E-region on the disk.

* * * * *